Oct. 15, 1963   E. FRISCH   3,107,209
CONTROL ROD COUPLING FOR NUCLEAR REACTORS
Filed Jan. 23, 1957   3 Sheets-Sheet 1

Fig. I.

Oct. 15, 1963 E. FRISCH 3,107,209
CONTROL ROD COUPLING FOR NUCLEAR REACTORS
Filed Jan. 23, 1957 3 Sheets-Sheet 3

United States Patent Office 3,107,209
Patented Oct. 15, 1963

3,107,209
CONTROL ROD COUPLING FOR NUCLEAR
REACTORS
Erling Frisch, Pittsburgh, Pa., assignor to Westinghouse
Electric Corporation, East Pittsburgh, Pa., a corporation of Pennsylvania
Filed Jan. 23, 1957, Ser. No. 635,910
7 Claims. (Cl. 204—193.2)

The present invention relates to a coupling mechanism and more particularly to a mechanism of the character described adapted for the end-wise use for coupling of elongated driving and driven member such as components of a control rod assembly associated with nuclear reactors.

As this description proceeds, it will be apparent that the aforesaid coupling as disclosed herein will be readily adaptable to general usage, particularly where the driven members must be inserted into a closely fitting channel therefor. In this application, however, the coupling of the invention is described in connection with a nuclear reactor, particularly of the pressurized water type. In the latter reactor, a core structure is frequently supported within a body of circulating coolant water, with the core structure comprising a plurality of elongated fuel elements suspended in parallel fashion therein and having a number of control rods suitably shaped to be inserted between selected groups of the fuel elements. The fuel elements frequently comprise at least a portion of a fissionable isotope such as U 233, U 235 or Pu 239 in which a controlled chain reaction is initiated, in a well-known manner, by atomic reaction thereof with thermal neutrons. The chain reaction is controlled or terminated by adjustment of the aforesaid control rods, which are composed at least in part of thermoneutronic absorbing material, such as cadmium, boron, cobalt, or their alloys.

Heretofore it has been the practice to provide the control rod with a stub shaft and to employ suitable means for engaging the same when coupling the components of a control rod adapted for use within a nuclear reactor core. The use of the stub shaft has prevented withdrawal of adjacent fuel assemblies and has resulted in a large and cumbersome coupling between the control rod and its associated driving shaft. Moreover, use of the stub shaft, as aforesaid, has required withdrawal of the control rods in order to permit the fuel elements to be withdrawn. However, to minimize hazards in removing the aforesaid fuel elements, it is desirable that the control rods remain in their scrammed or fully inserted positions within the reactor core. Because of the bulky nature and difficulty in the manipulation of prior couplings, it has been necessary to disengage the control rods from their associated shafts in order to withdraw or rearrange the fuel elements suspended in the reactor core. The operation of prior couplings developed for this purpose, in the case of pressurized water reactors, has been rendered all the more difficult by the frequent employment of a head of several feet of water overlying the reactor core to afford biological shielding therefor.

Accordingly, an object of the invention is to develop a novel, efficient and inexpensive coupling device.

More specifically, it is an object of the invention to provide a novel coupling having compact physical dimensions, and to facilitate the engagement and disengagement thereof.

Still other objects of the invention are to provide a novel coupling adapted for detachably engaging the control rods of a nuclear reactor to their associated driving shafts and to eliminate the necessity of providing the control rods with stub shafts.

A further object of the invention is to adapt a coupling of the character described for use within the spatial limitations imposed by the structural arrangement of a nuclear reactor.

A still further object of the invention is to arrange a coupling device for the remote operation thereof.

These and other objects, features and advantages of the invention will be made apparent during the following description of illustrative forms of the invention, with the description being taken in conjunction with the accompanying drawings, wherein.

In accordance with one application of the invention, a coupling is provided which can be easily secured to the downward end of a control rod driving shaft or other driving member. The coupling is furnished with means for engaging suitable notches or shoulders provided at the upward or adjacent end of the control rod or another suitable driven member, which means is conveniently and remotely operated from the upward or outward end of the driving shaft. Thus, in reactor applications for example, the coupling of the invention can be manipulated to engage or disengage the associated control rod without the necessity of providing each of the control rods with a stub shaft or other enlarged fixture, which otherwise requires complete withdrawal of the control rods in order to remove adjacent fuel assemblies. In another form of the invention, the control rod coupling is secured to a long-handled tool which can be lowered through the aforesaid head of coolant in order to withdraw individually the control rods or otherwise to manipulate the same. A suitable stop mechanism, which likewise is operable from a position outside of the reactor vessel is associated with each of the control rod shroud tubes for supporting the control rod during coupling thereof, at a selected position within the shroud tube and relative to the reactor core.

Figure 1:
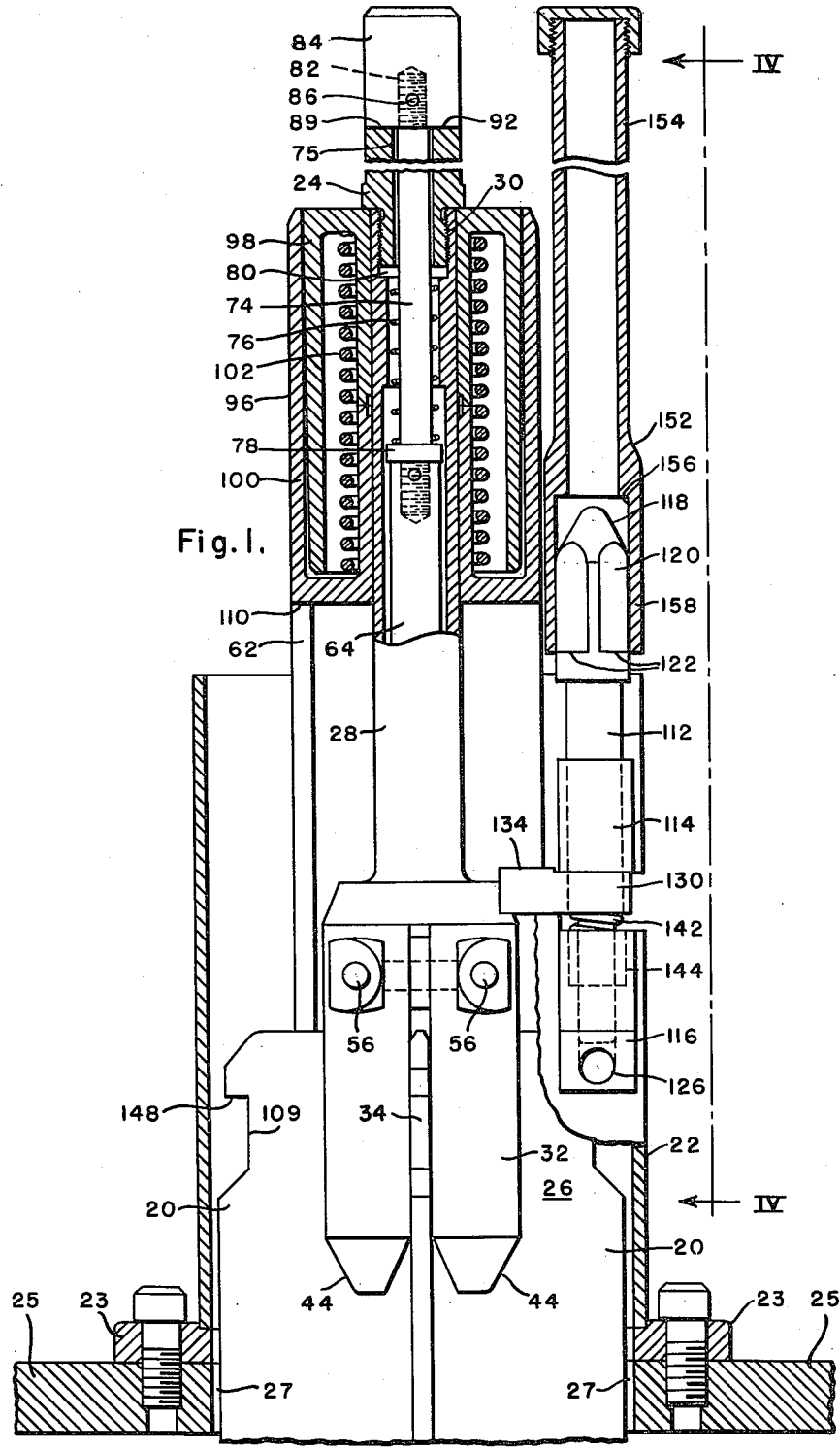
FIGURE 1 is a longitudinal, sectional view of one form of control rod coupling constructed in accordance with the principles of the invention.
Figure 2:
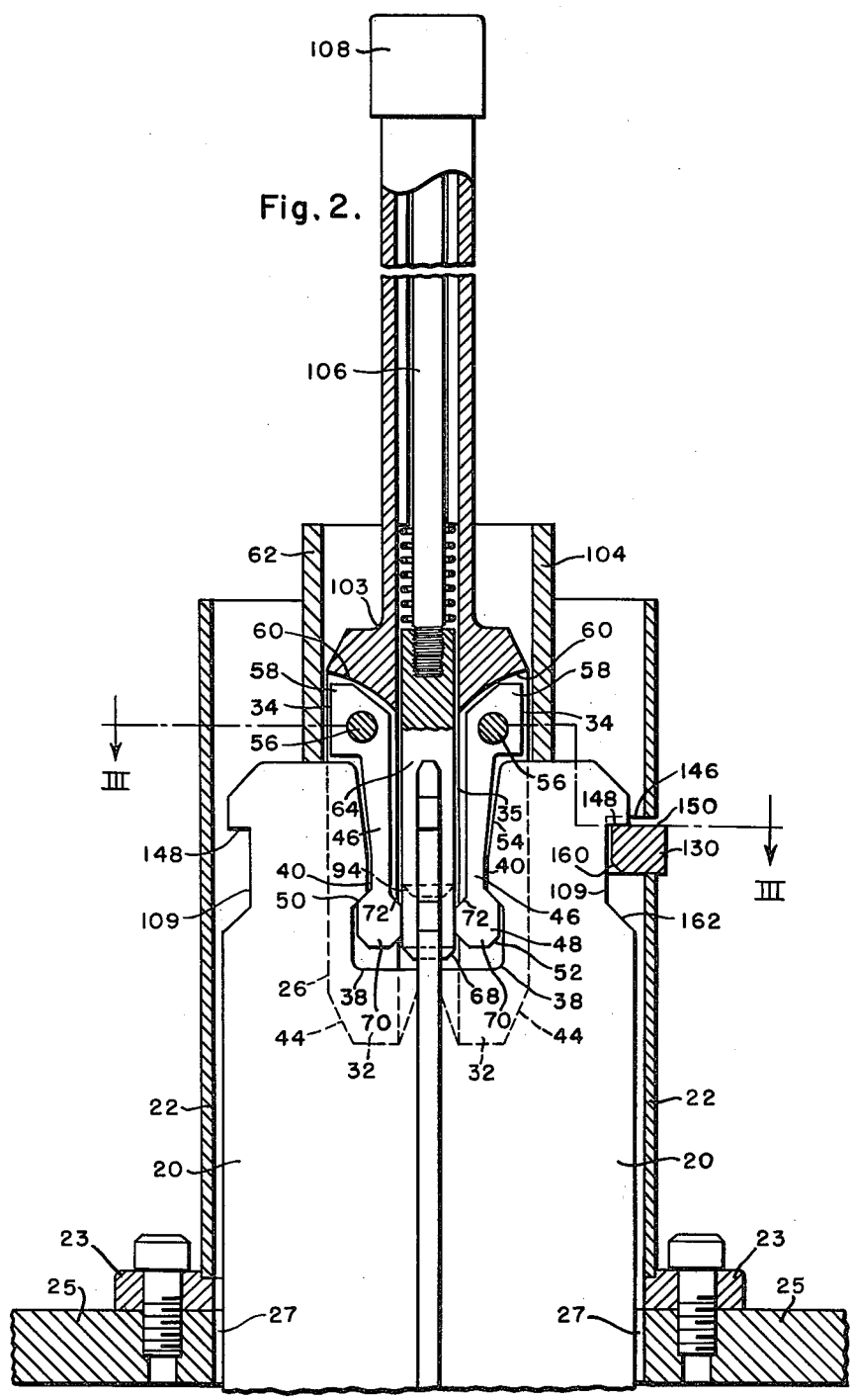
FIG. 2 is a longitudinal sectional view of another application of the control rod coupling device constructed according to the invention.
Figure 3:
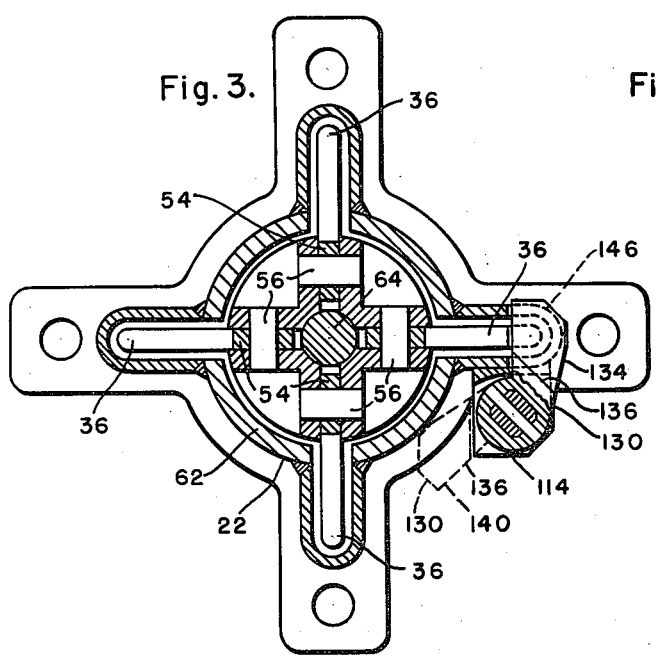
FIG. 3 is a cross sectional view taken along reference lines III—III of FIG. 2.

Referring now more particularly to FIGS. 1 to 3 of the drawings, the exemplary form of the invention shown therein is adapted for use, in this example, with a control rod 20 of cruciform cross section which is supported for movement within a shroud tube 22 of corresponding generally cruciform cross section by a control rod driving shaft 24 (FIG. 1) except that the central portion 62 (FIG. 3) of the shroud tube 22 is substantially circular in section. The shroud tube 22 is welded to a flange member 23, which is bolted to a reactor core upper supporting plate 25. When thus positioned, the shroud tube is aligned with a passage extending through the reactor core adjacent the fuel assemblies supported thereon and indicated generally by the reference character 27. A control rod coupling 26 is secured to a tubular extension 28 adapted to threadedly engage the downward end of the driving shaft 24, as indicated by the reference character 30. The coupling 26 includes a generally cylindrical body 32 having a number of radial slots 34 formed therein and extending longitudinally of the body 32. Each of the slots 34 joins a passage 35 extending longitudinally of the body 32 and formed centrally therein. In this example of the invention, the slots 34 are formed at right angles to one another and correspond to the number of arms 36 of the control rod 20, with four being utilized in this example of the invention. For purposes hereinafter to be enumerated, the upper ends of the arms 36 at the control rod 20 are provided with longitudinal and coextensive recesses 38, with each having an inwardly extending shoulder 40.

The cylindrical body 32 is adapted to engage the upward end of the control rod 20 by insertion of the arms 36 thereof individually into the slots 34. When thus inserted, the recesses 38 and portions of the control rod arms adjacent thereto are contained within the slots 34, respectively. This insertion is facilitated by chamfering the lower end of the cylindrical body 32 at positions adjacent the slots 34, as indicated by the reference character 44. Pivotally mounted within each of the slots 34 is a latching or locking lever 46, each of which is also movable within the recess 38 of the associated control rod arm 36 and generally in the plane of the latter, when the control rod is coupled to its drive shaft. Each latching lever is further provided with an outwardly facing operating extension 48 having camming surfaces 50 and 52. The camming surface 50 is adapted to engage the shoulder 40 of the associated control rod arm 36, when the latching lever 46 is latched thereagainst, by means presently to be described. Upon release of the aforesaid latching means, the inclination of the camming surface 50 causes the lever 46 to be moved inwardly to a position whereat the operating extension 48 is disengaged from the shoulder 40 upon relative separating movement of the body 32 and the control rod 20. The camming surface 52 is inclined such that the associated latching lever 46 will be moved inwardly by sliding engagement with the inclined wall 54 of the associated indent 38 as the arms 36 are inserted into the cylindrical body 32.

The latching levers 46 are mounted for pivotal movement upon fulcrum pins 56 in a position such that the heel 58 of each of the latching levers 46 will engage the end wall 60 of the respective slot 34 to limit the outward movement of the latching levers 46. Thus, the levers are prevented from protruding outwardly of the slots 34 and of the cylindrical body 32 where they would interfere with the insertion of the body 32 into central portion 62 (FIG. 3) of the shroud tube 22.

One form of means for manipulating the latching levers 46 to positions of engagement with the arms 36 of the control rod 20, includes the use of a latch pin or member 64 inserted through the tubular extension 28 of the coupling and extending into the longitudinal passage 35 (FIG. 2) formed in the cylindrical body 32. The latch pin 64 is chamfered at the lower end 68 thereof to facilitate engagement of the latch pin end portion or inner terminus with an inwardly extending protuberance 70 formed on each of the latching levers 46. When thus engaging the latching levers, the chamfered end 68 contacts a camming surface 72 arranged on each of the protuberances 70 to cause the latching levers 46 to move into engagement with indent means associated with the recesses 38 and defined by the shoulders 40 of the control rod 20. After the latching levers 46 have thus been positioned, their engagement with the shoulders 40, respectively, is secured by contact of the protuberances 70 with the outer periphery of the inner terminus of the latch pin 64.

Figure 5:
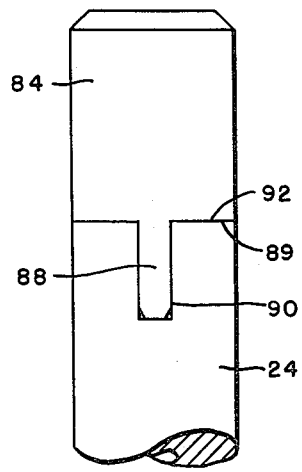
FIG. 5 is an elevational view of the latch button and upper end of FIG. 1, viewed as indicated by the reference lines V—V of FIG. 1.

As shown in FIG. 1 of the drawings, the latch pin 64 is threadedly secured to an operating rod 74 inserted through a channel 75 extending centrally of the driving shaft 24. The latch pin 64 is maintained in the aforesaid position of engagement with the inwardly extending protuberances 70 through the use of a compressional spring 76 bearing against a collar 78, which is mounted adjacent the end of the latch pin 64, and against the downward end 80 of the driving shaft 24. The operating rod 74, in this example, coextensively terminates with the driving shaft 24 at an accessible location disposed outside of the reactor vessel (not shown). At the outer end of the operating rod 74 a threaded stud 82 thereon threadedly engages a suitably tapped hole in a latch button 84. A pin 86 is inserted through appropriately arranged apertures in the latch button and stud 82 in order to prevent loosening thereof. As better shown in FIG. 5, the button 84 includes a pair of downwardly extending integral prongs 88 arranged for insertion within recesses 90 formed in the upward end of the driving shaft 24. When thus inserted the integral prongs 88 and the shoulder 89 of the latch button limit the downward movement of the latch button 84 and the latch pin 64. To secure the latching levers 46 of the coupling 26 in the disengaging position thereof, the latch button 84 is moved upwardly and axially away from the driving shaft 24 and then rotated to a position (not shown) whereat the prongs 88 are out of alignment with the recess 90 of the driving shaft. The latch button and associated linkage will then be lowered to a position of engagement of the integral prongs 88 with the extreme outward end 92 of the driving shaft 24 to retain the latch pin 64 against the action of the spring 76 at a position of disengagement of the latch pin with the inwardly extending protuberances 70 of the latching levers 46. This latter position of the latch pin is indicated by the dashed lines 94 of FIG. 2.

When the control rod 20 is scrammed in order to terminate quickly the chain reaction, the shock energy of the downward termination thereof is absorbed by a shock absorber or dashpot 96. The dashpot comprises an inverted cup member 98 rigidly secured to the tubular extension 28 of the control rod coupling 26, and an opposing cup member 100 mounted for sliding movement along the length of the tubular extension 28. The cups 98 and 100 are maintained in a normally spaced position by the shock absorbing spring 102. Upon the gravitational descent of the control rod 20, the driving shaft 24, and associated mechanism, the lower cup 100 contacts the upward end of the tubular shroud portion 62 in order to terminate the downward motion of the control rod 20. During the shock of scramming the control rod, the latch pin 64 is prevented from disengaging the coupling by means of the latch spring 76, urging the latch pin into a position of engagement with the latching levers 46.

After the driving shaft 24 is disengaged from the control rod 20, by suitably manipulating the coupling 26, the control rod 20 travels downwardly a relatively short distance after the release thereof, where it comes to rest against a suitable stop member (not shown). In order to retrieve the control rod in the extreme downward position thereof, the dashpot or shock absorber 96 is removed from the tubular extension 28 in order that the driving shaft 24 and coupling 26 can be inserted into the tubular portion 62 of the shroud tube 22. Removal of the shock absorber 96 can be accomplished by disengaging the respective threaded portions 30 of the driving shaft 24 and tubular extension 28 and thereafter removing the dashpot 96.

Alternatively, disassembly of the driving shaft 24 and the coupling 26 can be avoided by use of a long handled tool 103 as illustrated in FIG. 2 of the drawings and comprising a coupling mechanism 26 substantially identical to that described in connection with FIG. 1 but terminating in an elongated tubular extension 104. It will be appreciated that the tubular extension 104 is provided of such length as to extend to an accessible position outside of the reactor vessel. Inserted through the tubular extension 104 and arranged coextensively therewith is an elongated latch pin 106 arranged at the lower end thereof to engage the latching levers 46. At the upward end of the latch pin 106 there is secured a latch button 108 which is substantially similar to the latch button 84 described heretofore and shown in greater detail in FIG. 5 of the drawings.

In one arrangement of the invention, the control rod 20 is raised a short distance, by manipulation of the tool 103, until a suitable locking mechanism can be operated to engage one of the notches 109 provided on the outward edge of the arms 36 of the control rod. In this position of the control rod 20 the long-handled tool 103 is disengaged therefrom by manipulating the latch button 108 to withdraw the latch pin 106. The control rod coupling 26 of the driving shaft 24 is then caused to engage the control rod 20 in the raised position thereof in a manner described heretofore in connection with FIG. 1 of the drawings. In this latter position of the control rod 20 and driving shaft 24, the dashpot 96 need not contact the upward end 110 (FIG. 1) of the central tubular portion 62 of the shroud tube.

One arrangement for locking the control rod in the aforesaid partially raised position relative to the shroud tube 22, includes an operating rod 112 mounted for axial and rotative movement in a bearing block 114 and spring housing 116. As better shown in FIG. 3 of the drawings, the bearing block 114 and the spring housing 116 are secured adjacent the upward end of the control rod shroud tube 22. To the upper end of the operating rod 112 a knob 118 is affixed and is formed with a number of planar indents 120 extending along a portion of the length thereof. The indents 120 terminate a relatively short distance from the lower end of the operating knob 118 thereby forming a number of shoulders 122 disposed about the outer periphery of the knob 118. The lower end of the operating rod 112 is reduced in diameter at 124 for turning movement within a channel 126 arranged within the spring housing 116.

Between the reduced portion and the remainder of the operating rod 112 a squared configuration 128 is imparted to the operating rod, upon which a locking cam member 130 is mounted and positioned by the shoulders 132 formed adjacent the upward limit of the squared configuration 128. The locking cam member 130 is provided with an offset portion 134 having a shoulder 136 thereof (FIG. 3) adapted to engage lower end 138 of the bearing block 114 when the locking cam member 130 is swung outwardly to its inoperative position, as indicated by the dashed lines 140 in FIG. 3 and as shown in FIG. 1. To secure the locking cam member in the aforesaid inoperative position, a compressional spring 142 is mounted within a cavity 144 of the spring housing 116 and is arranged to urge the locking cam member 130 upwardly to ensure engagement of the offset 134 with the bearing block 114.

Figure 4:
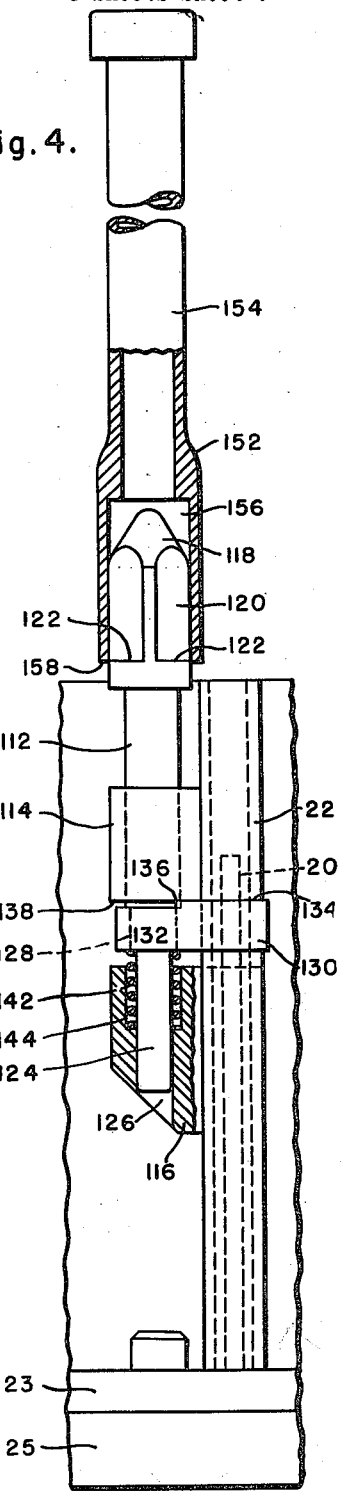
FIG. 4 is a partial elevational view of a portion of the mechanisms shown in FIG. 1, partly in section, as taken from reference lines IV—IV of FIG. 1.

To support temporarily the control rod 20 in the position illustrated in FIG. 2 of the drawings, the operating shaft 112 and the locking cam member 130 are rotated by suitable means, presently to be described, to a position whereat the locking cam member 130 is inserted through a suitably disposed opening 146 in the control rod shroud tube 22 and into the notch 109 formed in the adjacent arm 36 of the control rod. When thus inserted into the notch 109, the locking cam member 130 engages a shoulder 148 formed in the control rod arm 36 by the notch 109. The frictional engagement of the control rod with the upper surface 150 of the locking cam member secures the locking cam member in the position shown in FIGS. 2 and 4 where the locking cam is maintained in bearing contact against the upward end of the spring housing 116 and the lower wall of the shroud tube slot 146, by the weight of the control rod 20.

One means for rotating the operating rod 112 and the locking cam member 130 secured thereto includes a wrench 152 having an elongated handle 154 of such length as to extend to a convenient operating position outside of the reactor vessel, as better shown in FIG. 1 of the drawings. The lower end of the wrench 152 is provided with a cavity 156 in which the walls thereof are adapted respectively to engage the indents 120 of the knob 118. For convenience in using the wrench 152, the downward movement thereof relative to the knob 118 is terminated by engagement of the lower extremity 158 of the wrench with the shoulders 122 of the knob. When thus engaged with the knob 118, the wrench 152 and the knob are urged downwardly in order to effect downward axial movement of the operating rod 112 and of the locking cam member 130, against the action of the spring 142, to a position such that the shoulder 136 of the offset 134 of the locking cam will clear the lower edge 138 of the bearing block 114 to disengage the cam member therefrom. The locking cam member and the operating rod 112 are then rotated by the wrench 152 to a position of engagement with the control rod notch 109, as described heretofore. After the long handled tool is disengaged from the control rod 20 and the driving shaft 24 terminating in the coupling 26 is properly engaged with the control rod 20, the locking cam member 130 is rotated to its inoperative position (FIGS. 1 and 3) by appropriate manipulation of the wrench 152. In the event that disengagement of the locking cam member 130 from the control rod 20 is neglected, the locking cam member is moved out of the way of the control rod 20 and through the shroud tube slot 146 when the control rod 20 is moved upwardly by engagement of the camming surface 160 of the locking member with a suitably disposed camming surface 162 formed in the control rod notch 109.

From the foregoing it will be apparent that a novel and efficient coupling has been disclosed. The coupling of the invention, although described herein in connection with a control rod driving mechanism associated with a nuclear reactor, obviously can be adapted for use in applications involving other types of driving and driven members and in particular in those applications requiring a coupling which is capable of quick detachability and which is fabricated in a compact manner from a minimum of operating parts.

Therefore, numerous modifications will occur to those skilled in the art without departing from the scope of the appended claims. Moreover, it is to be understood that certain features of the invention can be utilized without a corresponding use of other features.

I claim as my invention:

1. A control rod assembly adapted for use in a nuclear reactor, said assembly comprising a control rod having a cruciform cross sectional configuration and having shouldered indents formed in an end thereof, said indents being spaced from the outer periphery of said control rod; an elongated hollow driving shaft terminating in a hollow cylindrical body having a plurality of radial slots formed longitudinally therein, said slots corresponding in number to that of the arms of said control rod; said control rod being inserted into said slots; a latching lever pivotally mounted in each of said slots, said levers each terminating in an operating extension; and means extending through said driving shaft and operable from the other end of said shaft for pivotally moving said levers to positions of engagement of said operating extensions with said shouldered indents.

2. A control rod assembly adapted for use in a nuclear reactor, said assembly comprising a control rod having a cruciform cross sectional configuration and having shouldered indents formed in an end thereof, said indents being spaced from the outer periphery of said control rod; an elongated hollow driving shaft terminating in a hollow cylindrical body having a plurality of radial slots formed longitudinally therein, said slots corresponding in number to that of the arms of said control rod; said control rod being inserted into said slots; a latching lever pivotally mounted in each of said slots, said levers each terminating in an operating extension; means extending through said driving shaft and operable from the other end of said shaft for pivotally moving said levers to positions of engagement of said operating extensions with said shouldered indents; a shroud tube through which said control rod is movable; a shock absorber secured to said driving shaft and engageable with said shroud tube for limiting the downward movement of said control rod; and means secured to said tube and operable through an opening in said tube for engaging a notch in the outer periphery of said control rod to support said control rod at a position whereat said shock absorber is in non-bearing engagement with said tube.

3. A control rod assembly adapted for use in a nuclear reactor, said assembly comprising a control rod having a cruciform cross sectional configuration and having shouldered indents formed in an end thereof, said indents being spaced from the outer periphery of said control rod; an elongated hollow driving shaft terminating in a hollow cylindrical body having a plurality of radial slots formed longitudinally therein, said slots corresponding in number to that of the arms of said control rod; said control rod being inserted into said slots; a latching lever pivotally mounted in each of said slots, said levers each terminating in an operating extension; means extending through said driving shaft and operable from the other end of said shaft for pivotally moving said levers to positions of engagement of said operating extensions with said shouldered indents, a shroud tube through which said control rod is movable; a shock absorber secured to said driving shaft and engageable with said shroud tube for limiting the downward movement of said control rod; and means secured to said tube and operable through an opening in said tube for engaging a notch in the outer periphery of said control rod to support said control rod at a position whereat said shock absorber is in non-bearing engagement with said tube, said last mentioned means including an operating rod, means for mounting said rod for rotative and axial movement and for urging said rod in an axial direction, a locking member secured to said rod and having an offset portion on a surface thereof arranged to engage said rod mounting means at the inoperative position of said locking member, and means for rotating and axially moving said rod for disengaging said locking member from said mounting means and for moving said locking member through said shroud tube opening to a position of control rod supporting engagement with said notch.

4. In a coupling mechanism, the combination comprising a tubular body, a tubular extension secured to said body and communicating with the interior thereof, a plurality of relatively narrow radial slots formed in said body and extending longitudinally therethrough, a latching lever pivotally mounted in each of said slots and movable in the plane thereof, said levers each terminating in an operating extension, a latch pin mounted for movement within said tubular extension and extendable into the interior of said body to a position of engagement with said latching levers, and means secured to the outward end of said latch pin and engaging said tubular extension for axially moving said latch pin, said last-mentioned means including a latch button terminating in at least one prong, said prong being insertable at a predetermined rotative position of said latch button into a cooperating recess formed in the outward end of said tubular extension so that said latch pin is moved into said engagement with said latching levers, said prong in other rotative positions of said latch button engaging said outward end to space said latch pin from said position of engagement.

5. A control rod assembly adapted for use in a nuclear reactor, said assembly comprising a control rod having a cruciform cross-sectional configuration and having shouldered indents formed in an end thereof, said indents being spaced from the outer periphery of said control rod; an elongated hollow driving shaft terminating in a hollow cylindrical body having a plurality of radial slots formed longitudinally therein, said slots corresponding in number to that of the arms of said control rod; said control rod being inserted into said slots; a latching lever pivotally mounted in each of said slots, said levers each terminating in an operating extension; means extending through said driving shaft and operable from the other end of said shaft for pivotally moving said levers to positions of engagement of said operating extensions with said shouldered indents; a channel member through which said control rod is movable; and means secured to said channel member and operable through an opening in said channel member for engaging a notch in the outer periphery of said control rod to support said control rod at a predetermined position thereof relative to said channel member.

6. A drive coupling including an elongated relatively thin driven member comprising at least one planar section extending the length thereof, said section having a recess at one end thereof, a hollow driving member having a slot at one end closely receiving said one end of the driven member section including said recess and portions of said section end adjacent said recess, a pair of juxtaposed locking levers freely and pivotally mounted on said driving member and movable within said recess and said slot in the plane of said driven member section toward and away from the adjacent sides respectively of said driven member recess, interfitting projecting and indent means on each of said levers and its said adjacent recess side, a movable latch member extending longitudinally through said driving member and terminating adjacent said locking levers, and means for moving said latch member longitudinally within said driving member to a locking position at which the inner terminus of said latch member is located at a position engageable with said locking levers to prevent movement of each lever in a direction to disengage the associated projection and indent means and to a released position at which said terminus is spaced from said locking levers to permit disengaging movement of said levers to effect disengagement of their associated projection and indent means.

7. A drive coupling including an elongated relatively thin driven member comprising at least one planar section extending the length thereof, said section having a recess at one end thereof, a hollow driving member having a slot at one end closely receiving said one end of the driven member section including said recess and portions of said section end adjacent said recess, a pair of juxtaposed locking levers freely and pivotally mounted on said driving member and movable within said recess and said slot in the plane of said driven member section toward and away from the adjacent sides respectively of said driven member recess, interfitting projecting and indent means on each of said levers and its said adjacent recess side, a movable latch member extending longitudinally through said driving member and terminating adjacent said locking levers, means for moving said latch member longitudinally within said driving member to a locking position at which the inner terminus of said latch member is located at a position engageable with said locking levers to prevent movement of each lever in a direction to disengage the associated projection and indent means and to a released position at which said terminus is spaced from said locking levers to permit disengaging movement of said levers to effect disengagement of their associated projection and indent means, a latch button affixed to the outward end of said latch member and rotatively mounted relative to said driving member, and cooperating prong and recess means on said latch button and the adjacent portion of said driving member, said prong and recess means being engageable at a predetermined rotative position of said latch button relative to said driving member to move said latch member terminus into said engageable position relative to said locking levers, said prong and recess means in other rotative positions of said latch button being disengaged to space said latch member terminus from said engageable position.

(References on following page)

References Cited in the file of this patent

UNITED STATES PATENTS

| | | |
|---|---|---|
| 1,827,966 | Bristol | Oct. 20, 1931 |
| 2,221,101 | Lefkowitz | Nov. 12, 1940 |
| 2,378,688 | Codlin | June 19, 1945 |
| 2,756,858 | Kasschau | July 31, 1956 |

OTHER REFERENCES

IDO–24020 Engineering Test Reactor, USAEC report dated July 1956, pages 97, 125a, 126.

NAA–SR–Memo–685, U.S. Atomic Energy Commission Document dated April 29, 1953, pp. 3, 4, 5, 7, 9, and 11. (Copy in Div. 46.)